United States Patent [19]

Scott

[11] B  3,993,119

[45] Nov. 23, 1976

[54] PROGRESSIVELY OR CONTINUOUSLY CYCLED MOLD FOR FORMING AND DISCHARGING A FINE CRYSTALLINE MATERIAL

[75] Inventor: John J. Scott, Niagara Falls, Canada

[73] Assignee: Norton Company, Worcester, Mass.

[22] Filed: Nov. 8, 1974

[21] Appl. No.: 522,038

[44] Published under the second Trial Voluntary Protest Program on February 3, 1976 as document No. B 522,038.

[52] U.S. Cl. ............................. 164/330; 164/331; 65/261; 264/57; 264/297
[51] Int. Cl.$^2$ ............................................. B22D 5/04
[58] Field of Search .................. 425/261, 447, 453; 164/130, 323, 324, 329, 330, 331; 65/261; 264/57, 297

[56] References Cited
UNITED STATES PATENTS

| 805,324 | 11/1905 | Robin-Larglois | 425/453 X |
|---|---|---|---|
| 1,469,820 | 10/1923 | Ruby | 425/453 X |
| 1,538,425 | 5/1925 | Debay | 425/453 X |
| 1,691,899 | 11/1928 | Poley | 425/453 X |
| 2,952,054 | 9/1960 | Katzman | 164/330 |
| 3,436,791 | 4/1969 | Chambon | 425/453 X |
| 3,502,136 | 3/1970 | Parmelee et al. | 164/331 X |
| 3,645,321 | 2/1972 | Robinson | 164/324 X |
| 3,835,917 | 9/1974 | Gyongyos | 164/279 |

Primary Examiner—Ronald J. Shore
Attorney, Agent, or Firm—Oliver W. Hayes

[57] ABSTRACT

An automatic progressively or continuously operative mold assembly for chilling a material which melts in excess of 1700° C and forming quickly a fine crystalline solid material therefrom by depositing said material in a molten state in the relatively thin spaces between a plurality of relatively thick heat sink plates maintained tightly contiguous as they are moved sequentially through and beyond a first mold filling or discharging station, and then moved very rapidly sequentially through a second mold emptying or discharging station in which the relatively thick heat sink plates are maintained spaced apart to discharge therefrom the fine crystalline solid material adhered thereto.

10 Claims, 6 Drawing Figures

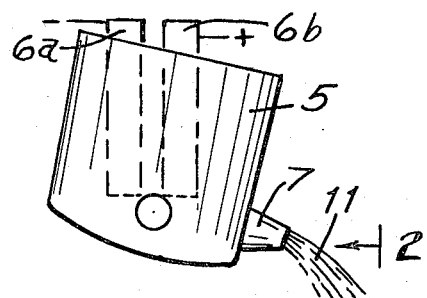
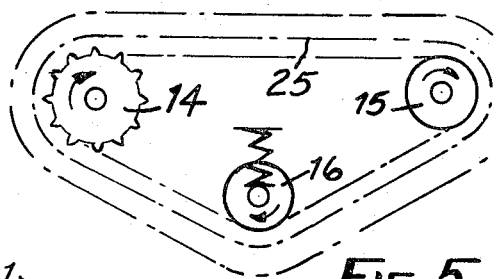
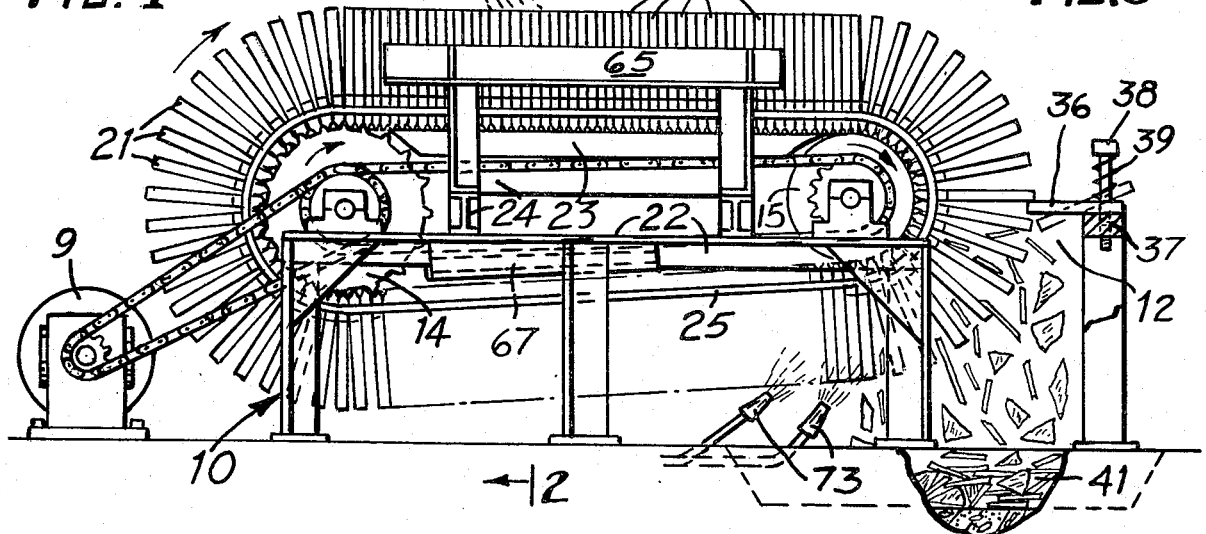
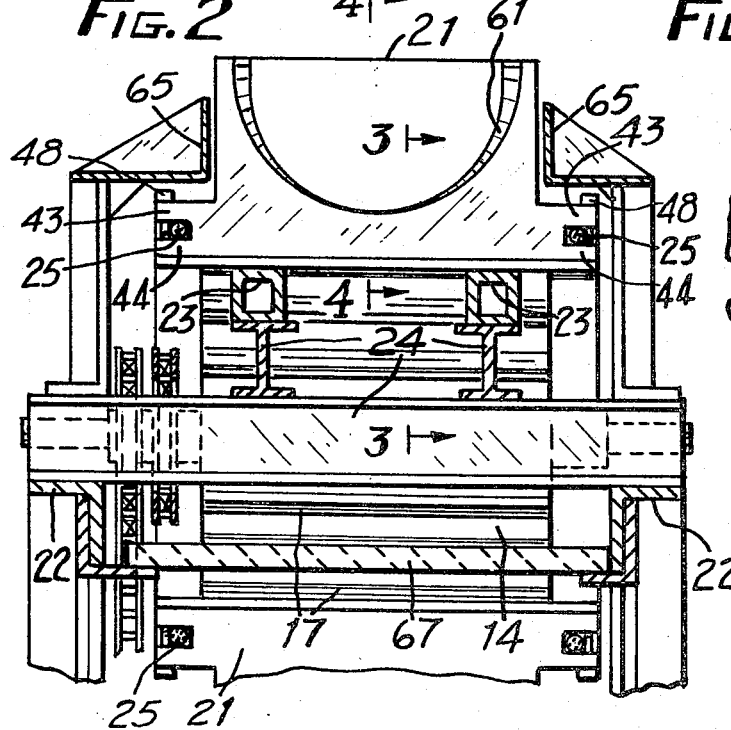
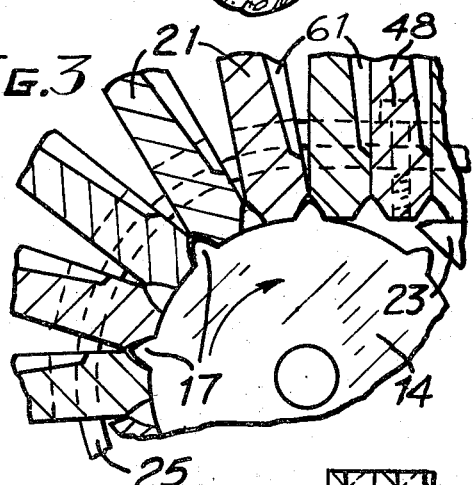
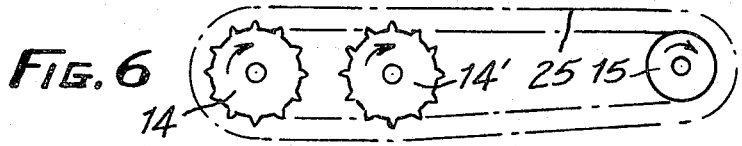

PROGRESSIVELY OR CONTINUOUSLY CYCLED MOLD FOR FORMING AND DISCHARGING A FINE CRYSTALLINE MATERIAL

BACKGROUND OF THE INVENTION

1. Field of Invention

This invention relates to a progressively or continuously operative mold assembly, and particularly to a mold assembly operative to receive a material molten at a temperature in excess of 1700°C in narrow recesses formed by mating mold elements traversing a mold filling station, and very quickly thereafter operative to discharge a fine crystalline abrasive material from spaced apart mold elements traversing a mold discharging station. Examples of such materials are fused alumina-zirconia or other fused abrasive oxide material, metal oxides or other non-metallic refractory material which melts at a temperature in excess of 1700°C.

2. Description of Prior Art

U.S. Pat. No. 3,570,586 issued to Lauener on Mar. 16, 1971, describes and claims a caterpillar mold machine for casting strips of aluminum or an aluminum alloy between the ends of opposing runs of mold blocks shaped on their ends to form the requisite strip cross-section. Lauener is primarily concerned with very elaborate provisions for isolating the relatively high temperature portions of the blocks from the supporting low temperature portions of the blocks and the supporting and guiding structure for the blocks, in order to maintain within acceptable limits the distortion and deflection of the portions of the blocks at which the aluminum sheet is formed.

It is interesting to note that the elaborate precautions of Lauener to limit deflection and distortion of the mold blocks were incorporated in a machine designed to cast a metal molten at slightly more than 600°C. In contrast, no such elaborate precautions are required in the high speed machine of the instant invention designed to cast materials molten in excess of 1700°C.

U.S. Pat. No. 3,835,917 issued Sept. 17, 1974, to Gyongyos as a continuation of application Ser. No. 309,800 filed Nov. 27, 1972, now abandoned, also discloses a machine for the continuous casting of strips of non-ferrous metals such as aluminum and aluminum alloys evidently resembling the machine disclosed in U.S. Pat. No. 3,570,586 of Lauener. While Gyongyos makes no showing whatsoever of the manner in which the respective mold blocks are interconnected, there is a suggestion that they may be interconnected in a manner similar to that illustrated and described in Lauener Pat. No. 3,570,586.

Gyongyos contemplates a machine arrangement in which the run of blocks in which a sheet of aluminum is cast are disposed at from 3° to 45° from the horizontal with the consequent tendency that undesireable gaps tend to appear between adjoining mold blocks of the run along which the casting is formed. In order to prevent the development of such gaps, Gyongyos provides a pair of brake assemblies coupled to the opposite sides of a single block adjacent the lower end of the run of blocks with the intention that the brake assemblies be adjusted to sufficient resistance to prevent formation of gaps between any of the entire series of blocks above the break equipped block. This of course means that the drive means for rotating all of the blocks must be powerful enough to drive every block past the brake assemblies adjusted to withstand movement of the entire run of blocks tending to form gaps therebetween.

South African Patent No. 8975/72 granted Jan. 3, 1974, and entitled "Method of Producing Abrasive" describes and illustrates a batch type arrangement for forming relatively thin sheets of abrasive material in the spaces between a series of adjoining relatively thick metal plates dependent from a common supporting frame, first filling the spaces with molten abrasive material, and then allowing the abrasive material to cool and thereby form hardened thin sheets thereof, and thereafter shifting the plates manually within the supporting frame therefor to release the thin sheets of abrasive material from between the plates.

Theoretically, the contiguous pairs of relatively thick mold plates of the South African Patent referred to above positively limits the thickness of the relatively thin spaces therebetween, consequently accelerating the rate of chilling the molten abrasive material deposited therein, and thereby advantageously limiting the size of the crystals formed in each sheet of chilled abrasive material.

However, in order to produce a useful quantity of material apparatus constructed according to the South African patent is necessarily relatively large and heavy, since it contains a substantial number of thick metal mold plates between which thin sheets of an abrasive material are formed. To date, the operation of this equipment has been either manual or manually controlled. That is, after the mold is filled with molten abrasive material, it is set aside to cool after it is filled with a molten abrasive material in excess of 1700°C, and then the thick metal plates are prided apart to free the hardened thin sheets of abrasive therebetween. The time involved in this manually controlled or manual operation is such that most of the sensible heat of the molten abrasive material in excess of 1700°C is transferred during the operation to the thick metal plates with resultant permanent deformation thereof. Consequently, the thick metal plates in fact must be reworked or replaced at relatively frequent intervals at a substantial cost for such rework or replacement, in order to maintain an approximation of the proper thickness therebetween.

In contrast to the batch type apparatus described and illustrated in the South African patent referred to above, the present invention contemplates very rapidly traversing a single series of consecutive thick plates with thin spaces therebetween first sequentially through a mold filling station and then sequentially along suitable guide rails toward a mold discharging station, with adjacent plates held tightly together both at the mold filling station and along the guide rails, and then sequentially through a mold discharging station, with the adjacent plates held spaced apart, all in one rapid continuous operation.

By this means, the transfer of sensible heat to the plates and consequent deformation of the plates is held to a minimum, notwithstanding temperature of the molden material in excess of 1700°C.

Incidentally, the present invention shares with the apparatus of the South African patents referred to above the ability to protect from the atmosphere almost the entire surface of the molten abrasive material while it cools, and the ability to limit positively the thickness and thereby control the physical properties of the thin sheets of material produced therein.

SUMMARY OF THE INVENTION

The present invention contemplates apparatus for chilling a molten material in excess of 1700°C to form hardened thin sheets of such material in a progressive or continuously operative mold assembly including a series of adjacent relatively thick plates each pair of which forms a thin space therebetween, including driving means operative to move succeeding thick mold plates sequentially through a first mold filling station, and at least one mold plate restraining means located beyond the mold filling station and operative in opposition to the mold plate driving means and acting directly upon each pair of adjoining mold plates to bias each pair of adjoining mold plates against each other so they are traversed first through the mold filling station and through a predetermined distance beyond the mold filling station toward a mold discharging station at which the hardened abrasive material is discharged from between adjacent mold plates as they are spaced apart. More particularly, as illustrated in the drawings, this invention pertains to a progressively or cyclically operable mold assembly in which a substantial number of relatively thick mold plates forming relatively thin spaces therebetween are supported upon endless chain or cable means for rotation over a first relatively large drum and then over a second relatively small drum in a continuous closed pass through a mold filling station and along a cooling section and then through a mold discharging station.

BRIEF DESCRIPTION OF THE DRAWINGS

Referring now to the drawings wherein like or corresponding reference numerals refer to like or corresponding parts, and wherein:

FIG. 1 is a schematic side elevation, partially in section, of the preferred embodiment of the instant invention, FIG. 2 is a partial section taken on line 2—2 of FIG. 1 showing additional details of means for supporting and interconnecting the respective mold plates, FIG. 3 is a partial cross section taken on line 3—3 of FIG. 2 showing means provided for driving the respective mold plates from one of the supporting drums therefor, FIG. 4 is a partial section taken on line 4—4 of FIG. 2 showing the preferred cross section of each of the respective mold plates used as described in the instant invention, FIG. 5 is a schematic representation of an alternative embodiment including an adjustable spring biased lower drum 16 arranged to maintain tension on the chain or cable means 25, and FIG. 6 is a schematic representation of an enlarged configuration of the instant invention in which the driving drum 14 is augmented by a second driving drum 14'.

DETAILED DESCRIPTION OF THE INVENTION

Referring first to FIG. 1 of the drawings, there is illustrated therein a side elevation of the progressive or continuous mold assembly characteristic of the instant invention, shown in operative relation to a furnace 5 suitable for the production therein of a quantity of molten material as by supplying a suitable electric current to the electrodes 6a and 6b and then by drawing off the molten material through a suitable tap or spout 7 positioned immediately above the filling station 11 on the mold assembly, generally designated by the reference numeral 10.

It should be understood that the representation of the furnace 5 in FIG. 1 of the drawing is a simplified schematic representation, noting that the furnace 5 is preferably positioned at right angles to the position shown so that the stream of molten material discharged from the spout falls directly into the recesses between adjacent plates. Alternatively, a furnace 5 disposed as shown in the drawing may be augmented by a vertical baffle extending above the plates at the filling station 11 to direct the molten material directly downwardly into the recesses between adjacent plates.

FIG. 1 also shows a schematic representation of a drive motor 9 connected by a chain drive and a series of pinions and gears to rotate the primary driving roll or drum 14 and thence the secondary roll or drum 15 so that they rotate in a 1 to 1 relationship as to their respective rates of rotation, with the surface of the driving drum 14 travelling faster than the surface of the drum 15 because drum 14 is of a larger diameter than drum 15. For example, this apparatus has been operated successfully with a primary driving drum 14 3½ inches in diameter and a secondary drum 2¼ inches in diameter both rotating at the same revolutions per minute in the direction indicated by the arrows thereon shown in FIG. 1.

FIG. 1 also shows a series of mold plates 21 mounted upon the frame 22 including the substantially horizontal guide rails 23 and secured for rotation around the respective drums 14 and 15 by a pair of chains or cables 25 constrained in notches on opposite sides of the respective mold plates 21 as shown best in FIG. 2.

The apparatus illustrated in FIG. 1 is designed to operate progressively or continuously at a relatively rapid rate upon the molten material deposited between and then promptly discharged from a series of thick mold plates, so that satisfactory quantities of material are produced by working rapidly with relatively smaller plates than those used in a manual operation. Consequently, the time between filling and discharging the mold plates is held to a minimum, thereby minimizing the transfer of sensible heat from the molten material to the thick mold plates. Therefore, the thick mold plates of the present invention show much less tendency to warp or permanently deform otherwise than the thick metal plates formally employed in manual operations. Consequently, the thick mold plates of the instant invention remain in service longer in good condition for close fitting engagement between adjacent pairs of plates while passing through the mold filling station and beyond.

Moreover, since the apparatus illustrated in FIG. 1 minimizes deformation of the thick mold plates, it advantageously employs a simple and effective means to maintain succeeding pairs of thick mold plates tightly contiguous at and beyond the mold filling station.

In other words, to minimize the heat build-up in the mold plates 21 made of metal having a melting point very substantially below 1700°C, the rate of rotation of the drums 14 and 15 is maintained as high as possible and still allow time for the molten material to solidify between the time it is deposited in the mold assembly at the filling station 11 and it reaches the mold discharging station 12.

By way of example, when the molten material used is alumina-zirconia or other fused abrasive oxide materials experience to date indicates that the time between departure from the mold filling station 11 and arrival at the mold discharging station 12 should not be less than 3 seconds.

Referring again to FIG. 1, as an additional means of limiting the heat build up in the mold plates 21 one or more nozzles 73 may be arranged to direct streams of water upon the mold plates as they leave the discharging station 12. Noting the availability of highly efficient nozzle configurations for various different applications, the nozzle assembly or nozzle assemblies 73 may be selected for optimized spray distribution therefrom to maximize the cooling effect produced thereby with a minimum quantity of cooling water used, just sufficient to leave the mold plates 21 dry before they reach the mold filling station 11.

Finally, FIG. 1 discloses adjacent the mold discharge station 12 a representative configuration of a knocker effective to jar succeeding mold plates 21 and thereby dislodge therefrom the chilled material formed thereagainst. The representative knocker is illustrated as an elongated bar 36 projecting into interferring engagement with the outer end of each mold plate 21 and mounted upon a supporting frame member 37 by means of an elongated bolt 38 engaging the frame member 37 and compressing against the bar 36 a spring 39.

Pit 41 is illustrated as one means of collecting the material discharged from the mold assembly at the discharging station 12 thereof. Alternatively, in order to cool the discharged material as quickly as possible, the pit itself may be filled with water.

The furnace 5 illustrated schematically in FIG. 1 may be of any type suitable for the preparation of a quantity of molten material, for example a furnace such as that illustrated in U.S. Pat. No. 775,654 issued to Higgins on Nov. 22, 1904. This furnace should be arranged to produce a relatively closely controlled quantity and duration of flow of molten material therefrom as by pouring or tapping the furnace 5 through a suitable tap 7 arranged to direct a stream of molten material therefrom centrally into the recesses 61 between a series of mold plates 21 passing through the mold filling station 11 of the mold assembly 10.

FIG. 2 taken on line 2—2 of FIG. 1 best illustrates the manner of interconnecting all of the mold plates 21 by means of a pair of opposing lugs 43 projecting from opposite sides of each mold plate and each having a notch 44 therein to receive an endless chain or cable 25 each secured in its mold plate constraining position by a series of bolts or pins 48 extending across the open ends of respective notches 44 at spaced intervals along the assembly of mold plates 21. FIG. 2 also shows in cross section representations of guide rails 23 which conveniently may be mounted by means of support 24 upon the frame 22 shown in FIG. 1.

Both FIGS. 1 and 2 show views of elongated deflectors 65 located to protect the endless chain or cable 25 from the extreme temperature of the molten material being deposited between the plates 21. Both FIGS. 1 and 2 also show views of a lower protective plate 67, preferably of a high temperature resistant material such as graphite, of a shape and size and positioned to protect the lower coarse of plates 21 from the extremely high temperature material deposited between the plates 21 at filling station 11.

FIG. 2 also shows a portion of the primary driving drum 14 including elongated ridges 17 extending lengthwise thereof and operative to drive the respective mold plates 21. End views of these same elongated ridges are shown in FIG. 3.

Finally, FIG. 2 shows a suitable peripheral shape for the shallow recess 61 formed in one side surface of each of the mold plates 21, including in the showing the fact that the edge of each shallow recess is tapered to facilitate the attachment of material therefrom. The cross section of each such recess 61 is shown in its entirety in FIG. 4.

FIG. 3 shows a partial sectional view through several of the mold plates 21 supported and constrained by a pair of endless chains or cables 25 for movement around the respective drums 14 and 15. FIG. 3 also illustrates the inner end of the recess 61 in one side surface of each mold plate 21.

Noting that each mold plate 21 conveniently may be about 1 foot wide and about 6 inches high with a somewhat less than semi-circular recess 61 formed in one side face thereof, FIG. 4 illustrates the preferable vertical section through each recess 61 tapering from about ¼ inch thickness at its upper edge to substantially 0 at its lower edge in each mold plate 21 preferably not less than one-half inch thick.

The operation of the device comprising the instant invention will now be described further in relation to the showing in each of the respective drawings as noted below.

Referring again to FIG. 1, since the successful operation of the instant invention does not depend upon specific details of the furnace 5, this portion of the structure illustrated in the drawings is shown schematically to be representative of any one of several well-known types of furnaces which may be used successfully to fill the mold assembly of the instant invention progressively or continuously as described herein.

Accordingly, structural and functional details of the furnace assembly 5 form no part of the present invention.

Referring again to FIG. 1, and particularly to the mold assembly generally designated by the reference numeral 10, this assembly includes a supporting structure or frame 22 supporting adjacent opposite ends thereof drums 14 and 15 rotatable about spaced horizontal axes and intermediate the ends thereof one or more horizontal guide rails 23 effective to support and to tend to restrain the lower ends of each of the series of plates 21 passing therealong in a common generally horizontal plane lengthwise thereof and laterally thereof, so that the respective plates may be maintained tightly contiguous to each other over a portion of the molding cycle in the manner described further below.

The series of plates 21 is supported upon the respective drums 14 and 15 for rotation therewith upon the frame 22 and along the guide rails 23 by means of a pair of endless chains or cables 25 loosely constrained within the notches 44 formed in the gears 43 projecting from the opposite sides of each of the plates 21, some such lugs being fitted at spaced intervals along the series of plates 21 with retaining bolts or pins 48 secured in place in the respective lugs by any suitable means such as a threaded end portion on the bolt 48 engaging corresponding internal threads in the lug 43. The endless chains or cables 25 serve solely to maintain the respective plates 21 assembled on the frame 22 and extending over the drums 14 and 15 as shown in FIG. 1.

The chains or cables 25 do not serve to drive the plates 21 around the respective drums nor do they serve primarily to maintain the adjacent plates tightly contiguous with each other at and beyond the filling station 11 on the mold assembly. In fact, the endless chains or cables 25 have been observed to travel around the respective drums at a rate substantially greater than the rate at which the respective plates 21 travel around the respective drums.

In fact, notwithstanding the schematized representation in FIG. 1, the chains or cables 25 actually fit loosely enough in the respective plates 21 that the plates 21 tend to hang vertically along the lower coarse of the mold assembly under their own weight rather than perpendicular to the chains or cables 25 as shown in the drawing.

Instead of providing laterally projecting lugs 43 with notches 44 at the opposite sides of each mold plate 21, the notches 44 may simply be provided adjacent the lower ends of each side edge of each mold plate 21. However, the provision of the laterally extending lug 43 is particularly desireable to position the respective chains or cables 25 further away from the flow of molten material deposited in the mold assembly, since such molten material attacks and relatively quickly destroys the material from which the chain or cable 25 is made. In addition, the provision of the lugs 43 for the chains or cables 25 allows them to be further projected, as noted above, by a pair of elongated deflectors 65 disposed above the lugs 43 and extending lengthwise of the chains or cables 25 in the area adjacent to the filling station 11 of the mold assembly 10, as seen in FIGS. 1 and 2.

The primary driving drum 14 and the secondary drum 15 both rotated clockwise, as seen in FIG. 1, by electric motor 9 together with guide rails 23 provide the means of maintaining succeeding adjacent pairs of plates 21 tightly contiguous as they travel together along the guide rails 23. This is because the respective drums 14 and 15, as shown, are rotated at the same speed, and because drum 14 is larger in diameter than drum 15, as shown in FIG. 1, so that the surface speed of driving drum 14 equipped with ridges 17 is higher than the surface speed of drum 15. Consequently, whenever the plates 21 are advanced through filling station 11 toward discharging station 12 at the speed determined by the rate of rotation of the relatively large drum 14, the relatively slower surface speed of drum 15 provides one means tending to restrain the succeeding plates 21 from such motion and thereby maintain the succeeding adjacent pairs of plates tightly contiguous at and beyond the filling station toward the mold discharging station.

In addition, since the bottom edges of the respective mold plates 21 are moved slidably along the upper surfaces of the guide rails 23 by rotation of the drum 14, the guide rails 23 function as a first restraining means tending to hold back each of the respective mold plates 21 moved beyond the drum 14 along the guide rails 23, thereby maintaining each adjacent pair of mold plates 12 closely contiguous at the filling station 11 on the mold assembly 10 and beyond. The drum 15 rotating at a slower surface speed than the surface speed of the drum 14 acts as a second restraining means for the respective mold plates 21.

As shown in FIG. 1 of primary driving drum 14 and secondary drum 15 is a representation of the minimum practical number of drums for supporting the shown plurality of mold plates 21 maintained assembled by endless chains or cables 25.

As an alternative, the two drums illustrated in FIG. 1 may be supplemented by a third drum 16 as shown in FIG. 5 located between and slightly below drums 14 and 15 and arranged to engage the mold plates 21 supported upon the lower ridges of the chains or cables 25. This third drum may also be a secondary non-driving drum like drum 15, and may be spring mounted upon vertically adjustable supports in order to adjust the tension in the chains or cables 25.

Moreover, if the size and the collective weight of the series of mold plates 21 exceeds an acceptable load for the primary driving drum 14 this drum may be assisted by an adjacent second primary driving drum 14', as shown in FIG. 6. Driving drum 14' may be located adjacent to driving drum 14 and be of the same diameter and operate at the same rate of rotation so that one said drum is effective to lift the mold plates 21 from the lower coarsers or reachers of the chains or cables 25 and the other said drum is effective to drive the respective mold plates 11 along the guide rails 23 against the resistance of the guide rails 23 and the secondary drum 15.

In order to be sure that the chilled material formed in thin sheets between the respective plates 21 is completely discharged from the mold assembly at the mold discharging station 12, the mold assembly desireably is equipped with one or more units of any suitable type of knocker or other suitable mold plate jarring device. For example, each plate 25 as it arrives at the mold discharging station 12 may be engaged by one or more bars 36 biased by a spring 39 to first restrain each plate 21, and the allow each plate 21 to snap past bar 36 and return to its normal position substantially radially of the drum 15, in order to be sure that each of the mold plates 21 is completely clear of any of the solid chilled material adherent thereto before it passes beyond the mold discharging station 12 and moves again toward the mold filling station 11.

If the thin sheet material removed at mold discharging station 12 is removed from the area adjacent thereto by automatic means such as a conveyor, this very hot material can desireably be cooled quickly by using a heat conductive metal conveyor belt and by directing a spray of cooling water onto the contents of the conveyor belt.

The thin spaces between the respective mold plates 21 may be provided in any suitable manner consistent with the provision of a fine crystalline solid thin sheet material therein. For example, the spaces between respective plates may be provided by spacer means attached to the surface of one of each pair of adjacent mold plates, as shown in South African Patent No. 8975/72 referred to above, to form a generally square or rectangular recess of substantially constant thickness throughout. However, the thickness of this recess need not be constant. In fact, the preferred embodiment of the plate for use in the mold assembly of the instant invention involves instead a plate 21 of excess thickness into which a generally semi-circular recess 61 is cut at an angle so that it varies from about one-fourth inch in depth along the upper edge of the plate 21 to just about 0 at the bottom of the recess, as shown best in FIGS. 3 and 4. In addition, as noted above, the side of the recess 61 is preferably tapered outwardly from the bottom of the recess so as to minimize the retaining effect of the recess upon the solidified sheet material formed therein.

Finally, it will be apparent that the drums 14 and 15 need not be of the relative sizes and need not be driven at the relative speeds indicated in the description of the showing in FIG. 1, so long as the driving drum 14 is arranged to have a surface speed such that the molten material deposited in the mold assembly at filling station 11 is hardened sufficiently to be discharged from the mold assembly at discharging station 12, and drum 15 is arranged to have a surface speed enough slower than that of drum 14 to assist the guide rails in maintaining the respective adjacent pairs of mold plates 21 tightly contiguous at the mold filling station 11 and thereafter as the plates are moved along the guide rails toward the mold discharging station 12.

In conclusion, the mold assembly of the instant invention is intended to be useful to form very quickly relatively thin solid sheets of any one of various materials introduced into the mold assembly at a relatively high temperature. For example, this mold assembly is useful for chilling molten alumina-zirconia or other fused abrasive oxide material, and also refractory metal oxides and mixtures thereof which melt at or above 1700°C.

What is claimed is:

1. In an abrasive slab casting device wherein a molten abrasive oxide material is cast between a plurality of generally vertically arranged chilling plates having opposing pairs of surfaces shaped to form a narrow abrasive receiving recess between each pair of plates, said plates being supported so they are normally free to move towards and away from each other, the improvement which comprises plate driving means in front of a casting position moveable at a predetermined velocity and operative on a group of plates, while generally vertically arranged, to push them toward, through and beyond the casting position, plate restraining means beyond said casting position having a surface which is moving at less than said predetermined velocity and which acts to restrain said group of plates so that adjacent pairs of plates are pressed together through and beyond said casting position to prevent leakage of molten abrasive from the narrow recesses, and plate separating means beyond the restraining means operative to separate adjacent plates, and thereby to discharge from the narrow recess the solidified abrasive oxide material formed therebetween.

2. A device as described in claim 1, and in addition at least one means adjacent to said discharge position arranged to jar each plate member as it advances into or through the discharge position to knock loose the thin slab of solidified material formed adjacent thereto.

3. Apparatus as described in claim 1, wherein guide rail means in frictional engagement with each succeeding said plate member beyond said filling position serve as said plate member restraining means.

4. Apparatus as described in claim 1, wherein said driving means comprises a driven drum rotatably mounted upon said supporting means and provided on its peripheral surface with means to drivingly engage succeeding said plate members to move said plate members toward, through and beyond said filling position.

5. Apparatus as described in claim 4, wherein said restraining means includes a second driven drum operative concurrently upon each said plate member engaged thereby and rotatably mounted upon said supporting means and driven at a surface speed less than said driving drum, whereby said second drum also serves to restrain all of said plate members from movement through and beyond said filling position, and whereby said second drum additionally serves as the plate member separating means at said discharge position.

6. Apparatus as described in claim 1, wherein the entire plurality of said plate members is maintained properly positioned for sequential movement first through said filling position and then through said discharge position by constraining means including elongated endless flexible means.

7. Apparatus as described in claim 1, wherein the entire time elasped between movement of each said plate member through said filling position and the same said plate member through said discharge position is not less than 3 seconds.

8. Apparatus as described in claim 1, wherein the thickness of each narrow abrasive receiving recess between each pair of plate members is progressively reduced from a maximum adjacent the edge at which molten abrasive oxide material is received therein and a minimum at the edge most remote therefrom.

9. Apparatus as described in claim 1, and in addition cooling means operative after each said plate member leaves said discharge position and before each said plate member reaches said filling position to substantially reduce the heat content of each said plate member.

10. Apparatus as described in claim 2, and in addition spring biased means to maintain said means adjacent to said discharge position arranged to jar each said plate member, and yieldable to allow each said plate member to pass.

* * * * *